US010482315B2

(12) United States Patent
Aso et al.

(10) Patent No.: US 10,482,315 B2
(45) Date of Patent: Nov. 19, 2019

(54) DISPLAY APPARATUS, DISPLAY METHOD, AND NON-TRANSITORY COMPUTER-READABLE RECORDING MEDIUM

(71) Applicant: Panasonic Intellectual Property Corporation of America, Torrance, CA (US)

(72) Inventors: Mitsuhiro Aso, Osaka (JP); Hiroyuki Kubotani, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 86 days.

(21) Appl. No.: 15/913,967

(22) Filed: Mar. 7, 2018

(65) Prior Publication Data

US 2018/0285626 A1    Oct. 4, 2018

(30) Foreign Application Priority Data

Mar. 28, 2017 (JP) ................................ 2017-064019
Aug. 3, 2017 (JP) ................................ 2017-150988

(51) Int. Cl.
*G06K 9/62* (2006.01)
*G06K 9/00* (2006.01)
*G03B 21/00* (2006.01)
*G06K 9/20* (2006.01)

(52) U.S. Cl.
CPC ......... *G06K 9/00201* (2013.01); *G03B 21/00* (2013.01); *G06K 9/20* (2013.01); *G06K 2009/2045* (2013.01)

(58) Field of Classification Search
CPC .......... G06K 9/00671; G06K 9/00201–00214; G06K 9/62–726; G06K 2209/17; G06T 19/006
See application file for complete search history.

(56) References Cited

U.S. PATENT DOCUMENTS 6,334,684 B1 *  1/2002  Yoshida ............... G03B 21/001
                                                                     353/28
2015/0379892 A1 * 12/2015  Sako ................... G06F 19/3475
                                                                    434/127

FOREIGN PATENT DOCUMENTS

JP            2010-191745           9/2010

OTHER PUBLICATIONS

Machine translation of JP 2010-1491745, Akihiko, Sep. 2, 2010, 22 pages total. (Year: 2010).*

* cited by examiner

*Primary Examiner* — Brian Werner
(74) *Attorney, Agent, or Firm* — Greenblum & Bernstein, P.L.C.

(57) ABSTRACT

A display apparatus includes: a display unit that displays a first image; an obtaining unit that obtains a recognition result of recognizing a foodstuff serving as a cooking target on the basis of a photographed image obtained from a camera; a determination unit that determines whether a recognized foodstuff indicated by the recognition result is present in a superposable area where the first image can be superposed on the foodstuff; and a display control unit that causes the display unit to: (i) superpose the first image on the foodstuff when the determination unit determines that the foodstuff is present in the superposable area; and (ii) superpose the first image on a second image when the determination unit determines that the foodstuff is not present in the superposable area.

15 Claims, 8 Drawing Sheets

DISPLAY APPARATUS, DISPLAY METHOD, AND NON-TRANSITORY COMPUTER-READABLE RECORDING MEDIUM

BACKGROUND

1. Technical Field

The present disclosure relates to a display apparatus, a display method, and a non-transitory computer-readable recording medium.

2. Description of the Related Art

Hitherto, technology for identifying the type of a foodstuff placed on a cooking table by photographing the foodstuff, and superposing, on the foodstuff placed on the cooking table, a guidance image indicating a cooking method (such as a way to cut) determined from a cooking recipe have been disclosed (see, for example, Japanese Unexamined Patent Application Publication No. 2010-191745). Accordingly, the cooker can cook easily by looking at the guidance image superposed on the foodstuff while cooking.

SUMMARY

In one general aspect, the techniques disclosed here feature a display apparatus including: a display unit that displays a first image for assisting a cooker with a cooking action; an obtaining unit that obtains a recognition result of recognizing a foodstuff serving as a cooking target on the basis of a photographed image obtained from a camera; a determination unit that determines whether a recognized foodstuff indicated by the recognition result is present in a superposable area where the first image can be superposed on the recognized foodstuff, out of a displayable area of the display unit; and a display control unit that causes the display unit to: (i) superpose the first image on the recognized foodstuff when the determination unit determines that the recognized foodstuff is present in the superposable area; and (ii) display a second image generated on the basis of the recognized foodstuff included in the photographed image obtained from the camera and superpose the first image on the second image when the determination unit determines that the recognized foodstuff is not present in the superposable area.

Accordingly, a cooker can be assisted with a cooking action even when a foodstuff is present outside a superposable area.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
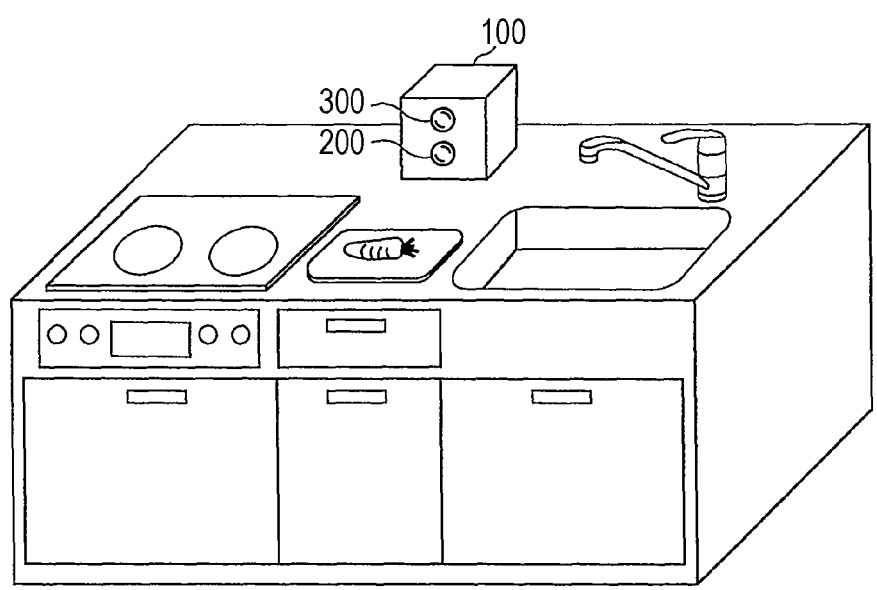
FIG. 1 is a diagram schematically illustrating a display apparatus according to a first embodiment.

Underlying Knowledge Forming Basis of the Present Disclosure

When a projector for superposing and displaying an image for assisting a cooker with a cooking action is fixedly installed, if a foodstuff is present outside a superposable area, the cooker needs to move the foodstuff to the superposable area in order to receive assistance for the cooking action. However, due to space limitations of the cooking table, the cooker may not be able to move the foodstuff to the superposable area. Even when the projector is a portable apparatus, due to space limitations of the cooking table, the cooker may not be able to move the projector such that the foodstuff will be included in the superposable area.

A display apparatus of the related art may not be able to superpose and display a guidance image on a foodstuff if the foodstuff is present outside an area where a guidance image can be superposed, and the display apparatus may not be able to assist the cooker with a cooking action.

Some cookers feel that an image superposed on a foodstuff for assisting them with a cooking action is disturbing and want to place the foodstuff outside a superposable area while cooking, but these cookers still may want to receive assistance for the cooking action independent of the image superposed on the foodstuff.

To solve the above-described problems, the present disclosure provides a display apparatus, a display method, and a non-transitory computer-readable recording medium capable of assisting a cooker with a cooking action even when a foodstuff is present outside a superposable area.

A display apparatus according to the present disclosure includes: a display unit that displays a first image for assisting a cooker with a cooking action; an obtaining unit that obtains a recognition result of recognizing a foodstuff serving as a cooking target on the basis of a photographed image obtained from a camera; a determination unit that determines whether a recognized foodstuff indicated by the recognition result is present in a superposable area where the first image can be superposed on the recognized foodstuff, out of a displayable area of the display unit; and a display control unit that causes the display unit to: (i) superpose the first image on the recognized foodstuff when the determination unit determines that the recognized foodstuff is present in the superposable area; and (ii) display a second image generated on the basis of the recognized foodstuff included in the photographed image obtained from the camera and superpose the first image on the second image when the determination unit determines that the recognized foodstuff is not present in the superposable area.

Accordingly, when a foodstuff is present in a superposable area, a first image for assisting a cooker with a cooking action is superposed on the foodstuff and is displayed; and, when the foodstuff is not present in the superposable area, the first image is superposed on a second image and is displayed. Thus, even when the foodstuff is not present in the superposable area, the cooker can cook while looking at the first image superposed on the second image (such as a photograph or a computer graphics image) generated on the basis of the foodstuff included in a photographed image obtained from the camera. Therefore, the cooker can be assisted with the cooking action even when the foodstuff is present outside the superposable area.

The display unit may include a projector.

Accordingly, the first image can be easily superposed on the foodstuff or the second image by the projector. Thus, the cooker is enabled to intuitively grasp the cooking action.

The display unit may include a projector and a display, and the display control unit may cause the projector to superpose the first image on the recognized foodstuff when the determination unit determines that the recognized foodstuff is present in the superposable area, and may cause the display to superpose the first image on the second image when the determination unit determines that the recognized foodstuff is not present in the superposable area.

Accordingly, the first image can be easily superposed on the foodstuff by the projector, and an image where the first image is superposed on the second image can be easily displayed by the display. Thus, the first image can be provided to the cooker using the display even when the first image cannot be projected by the projector.

After the display unit superposes the first image on the recognized foodstuff, the obtaining unit may newly obtain a recognition result of recognizing a foodstuff serving as a cooking target on the basis of a photographed image newly obtained from the camera. The determination unit may newly determine whether a recognized foodstuff indicated by the newly obtained recognition result is present in a superposable area where the first image can be superposed on the recognized foodstuff, out of the displayable area of the display unit. The display control unit may cause the display unit to superpose the first image on the second image when the determination unit newly determines that the recognized foodstuff is not present in the superposable area.

Accordingly, the cooker can switch a target on which the first image is superposed from the foodstuff to the second image by moving the foodstuff from the inside to the outside of the superposable area.

For example, when the cooker feels that the first image superposed on the foodstuff is disturbing, the cooker can receive assistance for the cooking action from the first image superposed on the second image by moving the foodstuff from the inside to the outside of the superposable area.

After the display unit superposes the first image on the second image, the obtaining unit may newly obtain a recognition result of recognizing a foodstuff serving as a cooking target on the basis of a photographed image newly obtained from the camera. The determination unit may newly determine whether a recognized foodstuff indicated by the newly obtained recognition result is present in a superposable area where the first image can be superposed on the recognized foodstuff, out of the displayable area of the display unit. The display control unit may cause the display unit to superpose the first image on the recognized foodstuff when the determination unit newly determines that the recognized foodstuff is present in the superposable area.

Accordingly, the cooker can switch a target on which the first image is superposed from the second image to the foodstuff by moving the foodstuff from the outside to the inside of the superposable area. Therefore, when the cooker wants to receive assistance for a cooking action by having the first image superposed on the foodstuff, the cooker can receive assistance for the cooking action by moving the foodstuff from the outside to the inside of the superposable area.

The second image may be a photograph of the recognized foodstuff obtained by photographing done by the camera.

Accordingly, because the first image is superposed on the photograph of the actual foodstuff to be cooked, the cooker can more easily apply the assistance for the cooking action indicated by the first image to the actual foodstuff.

The second image may be a computer graphics image indicating the recognized foodstuff.

Accordingly, because the first image is superposed on the computer graphics image indicating the actual foodstuff to be cooked, the cooker can more easily apply the assistance for the cooking action indicated by the first image to the actual foodstuff.

A display size of the second image may be equivalent to a size of the recognized foodstuff.

Accordingly, because the first image is superposed on the second image whose display size is equivalent to the actual foodstuff to be cooked, the cooker can more easily apply the assistance for the cooking action indicated by the first image to the actual foodstuff.

The determination unit may further determine whether the recognized foodstuff is present in the displayable area. When the determination unit determines that the recognized foodstuff is not present in the displayable area, the determination unit may further determine whether a distance between a position of the recognized foodstuff and a first end portion is shorter than a certain distance, the first end portion being an end portion of the displayable area that is nearer to the position of the recognized foodstuff. When the determination unit determines that the distance between the position of the recognized foodstuff and the first end portion is shorter than the certain distance, the display control unit may cause the display unit to display an image based on the first image between the first end portion and an end portion of the superposable area.

Accordingly, when the foodstuff is not present in the displayable area of the display unit, if the distance between the position of the foodstuff and the end portion of the displayable area nearer to the position of the foodstuff is shorter than a certain distance (such as 5 cm), an image based on the first image is displayed near the end portion of the displayable area (that is, near the foodstuff). Therefore, the cooker can more accurately cook the foodstuff in accordance with the image based on the first image, which is displayed near the foodstuff.

The image based on the first image may include an image indicating a way to cut the recognized foodstuff.

Accordingly, the cooker can more accurately cook, such as cut, the foodstuff in accordance with an image indicating the way to cut the foodstuff, which serves as the image based on the first image, displayed near the foodstuff.

The display unit may further display an outer edge of a photographable area of the camera, and an outer edge of the superposable area.

Accordingly, because the outer edge of the photographable area of the camera is displayed, the cooker can know where to place the foodstuff in order that the foodstuff may be photographed by the camera. Because the outer edge of the superposable area is displayed, the cooker can know where to place the foodstuff in order to receive assistance for the cooking action from the first image superposed on the foodstuff or from the first image superposable on the second image.

The display apparatus may further include the camera; and a recognition unit that recognizes a foodstuff serving as a cooking target on the basis of a photographed image obtained from the camera. The obtaining unit may obtain the recognition result from the recognition unit.

As has been described above, the display apparatus may obtain the recognition result of recognizing a foodstuff serving as a cooking target, which is done by itself, or may obtain the recognition result of recognizing a foodstuff serving as a cooking target, which is done by an external server, from the server.

A display method according to the present disclosure is a display method for a display apparatus including a display unit that displays a first image for assisting a cooker with a cooking action, the method including: obtaining a recognition result of recognizing a foodstuff serving as a cooking target on the basis of a photographed image obtained from a camera; determining whether a recognized foodstuff indicated by the recognition result is present in a superposable area where the first image can be superposed on the recognized foodstuff, out of a displayable area of the display unit; and causing the display unit to: (i) superpose the first image on the recognized foodstuff when it is determined in the determining that the recognized foodstuff is present in the superposable area; and (ii) display a second image generated on the basis of the recognized foodstuff included in the photographed image obtained from the camera and superpose the first image on the second image when it is determined in the determining that the recognized foodstuff is not present in the superposable area.

Accordingly, a cooking method for assisting a cooker with a cooking action even when a foodstuff is present outside a superposable area can be provided.

A non-transitory computer-readable recording medium according to the present disclosure is a non-transitory computer-readable recording medium storing a program causing a computer to execute a process for controlling an operation of a display apparatus including a display unit that displays a first image for assisting a cooker with a cooking action, the process including: obtaining a recognition result of recognizing a foodstuff serving as a cooking target on the basis of a photographed image obtained from a camera; determining whether a recognized foodstuff indicated by the recognition result is present in a superposable area where the first image can be superposed on the recognized foodstuff, out of a displayable area of the display unit; and causing the display unit to: (i) superpose the first image on the recognized foodstuff when it is determined in the determining that the recognized foodstuff is present in the superposable area; and (ii) display a second image generated on the basis of the recognized foodstuff included in the photographed image obtained from the camera and superpose the first image on the second image when it is determined in the determining that the recognized foodstuff is not present in the superposable area.

Accordingly, a non-transitory computer-readable recording medium storing a program causing a computer to execute a process for assisting a cooker with a cooking action even when a foodstuff is present outside a superposable area can be provided.

All of embodiments described below indicate general or specific examples. Numerical values, shapes, components, steps, the order of steps, and so forth indicated in the following embodiments are only exemplary and are not intended to limit the present disclosure. Furthermore, among the components in the following embodiments, components that are not defined in an independent claim indicating the broadest concept are described as arbitrary components.

First Embodiment

A first embodiment of the present disclosure will be described using FIGS. 1 to 7.

1. Configuration of Display Apparatus

FIG. 1 is a diagram schematically illustrating a display apparatus 100 according to the first embodiment.

As illustrated in FIG. 1, the display apparatus 100 is installed on a built-in kitchen or the like. The display apparatus 100 is an apparatus for providing a cooker with guidance on a cooking method such as a way to cut a foodstuff placed on a cooking table (a cutting board illustrated in FIG. 1), that is, an apparatus for assisting the cooker with a cooking action. For example, the display apparatus 100 is a potable apparatus and is installed at a position behind the cooking table when viewed from a place where the cooker stands (front side in FIG. 1). Note that the display apparatus 100 may not necessarily be a portable apparatus, and may be a built-in apparatus included in, for example, a built-in kitchen or the like.

The display apparatus 100 includes a display unit 200 and a camera 300.

The display unit 200 displays a first image for assisting the cooker with a cooking action around the cooking table. The display unit 200 includes, for example, a projector, and projects the first image with the use of the projector. Note that the display unit 200 may include a display, and may display the first image and a later-described second image on the display. The camera 300 photographs a foodstuff around the cooking table. The cooker can receive assistance (cooking support) for a cooking action when an image generated on the basis of data obtained by photographing, by the camera 300, around the cooking table is projected from the display unit 200.

Note that the display apparatus 100 may not necessarily include the camera 300, and the camera 300 may be provided separately from the display apparatus 100.

Next, the functional configuration of the display apparatus 100 will be described using FIG. 2.

Figure 2:
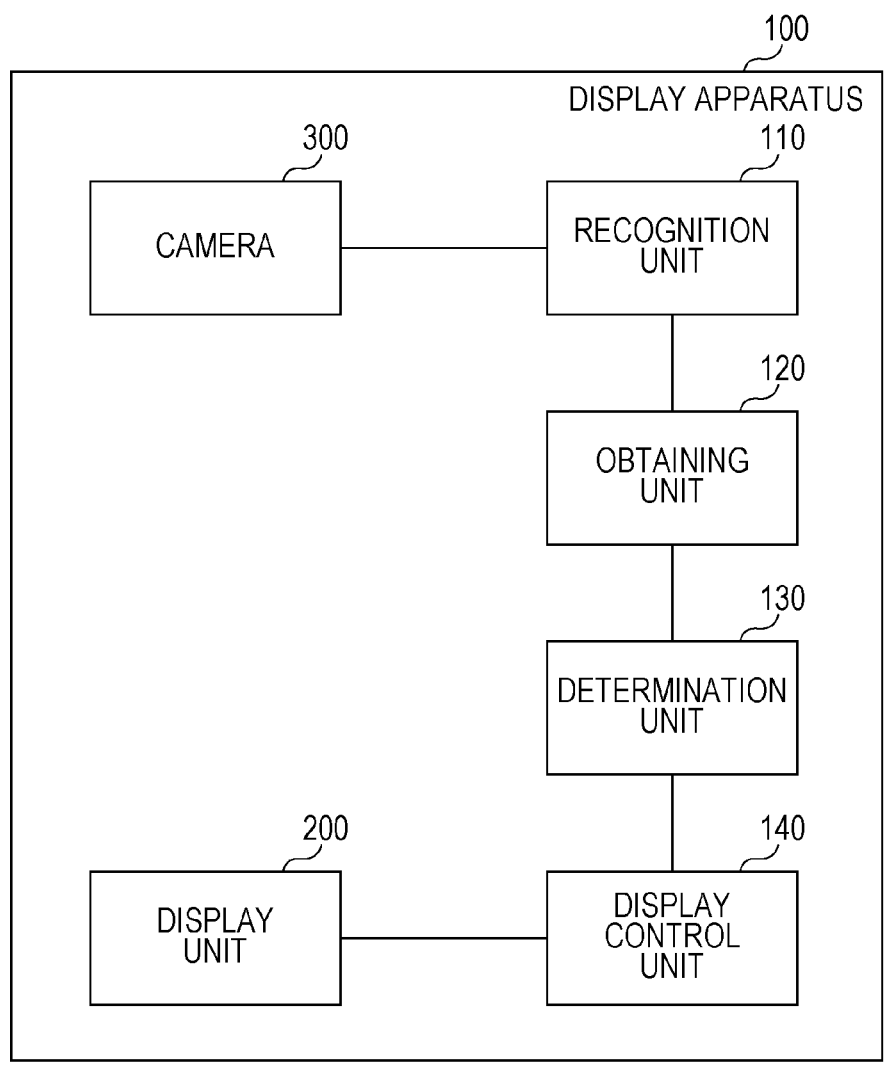
FIG. 2 is a block diagram illustrating an example of the configuration of the display apparatus according to the first embodiment.

FIG. 2 is a block diagram illustrating an example of the configuration of the display apparatus 100 according to the first embodiment.

As illustrated in FIG. 2, the display apparatus 100 includes, as functional components, a recognition unit 110, an obtaining unit 120, a determination unit 130, and a display control unit 140. The display apparatus 100 additionally includes a storage unit (not illustrated). Although not illustrated in FIG. 2, the display apparatus 100 includes, for example, a communication unit (not illustrated), and is capable of communicating with an external server, a mobile phone, and the like wirelessly or by wire. The recognition unit 110, the obtaining unit 120, the determination unit 130, and the display control unit 140 are realized by, for example, a processor or the like that executes a program stored in the storage unit. Alternatively, these units 110, 120, 130, and 140 may be realized by a microcomputer or a dedicated circuit, for example.

The storage unit includes memory such as read-only memory (ROM) that stores programs and data, and random-access memory (RAM) for use in storing data in execution of programs. The storage unit additionally stores cooking recipes, a first image, a second image, and so forth. The first image is an image for assisting the cooker with a cooking action, and is, for example, an image indicating guide lines when cutting a foodstuff. The first image is stored for each cooking method for a foodstuff in each cooking recipe. Specifically, the storage unit stores first images indicating guide lines representing various ways to cut (cooking methods), such as slicing into rings, chopping into chunks, and filleting into three pieces, for the individual types of foodstuffs such as fish, vegetables, and meat. For example, when these first images are superposed on the foodstuffs, the cooker can easily cook (cut, for example) the foodstuffs. The second image is an image generated on the basis of a recognized foodstuff included in a photographed image obtained from the camera 300, and is, for example, a computer graphics image or a photograph indicating the foodstuff. The second image is stored for each type of foodstuff. Specifically, the storage unit stores second images, such as computer graphics images or photographs, representing various types of foodstuffs such as fish, vegetables, and meat.

The camera 300 photographs, for example, a later-described area 301 serving as a photographing range. A photographed image obtained by photographing done by the camera 300 is output to the recognition unit 110. The camera 300 may photograph in response to, for example, reception of a photographing instruction. For example, when the display apparatus 100 is provided with an input unit (not illustrated), the input unit may output an input photographing instruction to the camera 300. The input unit may be an interface such as a keyboard or a touchscreen. When there is a mobile terminal (not illustrated) that operates the display apparatus 100 via a network (not illustrated), the camera 300 may receive a photographing instruction from the mobile terminal. The network may be a wired network or a wireless network.

The camera 300 may photograph the area 301 whenever the camera 300 receives a photographing instruction. Alternatively, the camera 300 may photograph the area 301 every certain time in response to reception of a photographing instruction. In this case, the photographing instruction is an instruction to start photographing. In addition, the camera 300 may end photographing in response to reception of an instruction to end the photographing from the above-mentioned input unit or mobile terminal.

The recognition unit 110 recognizes a foodstuff serving as a cooking target on the basis of a photographed image obtained from the camera 300. A foodstuff serving as a cooking target is prepared by, for example, the cooker, and is placed in the photographable area 301 of the camera 300. For example, the recognition unit 110 recognizes a foodstuff that is present in the area 301 by recognizing a photographed image obtained by photographing the interior of the area 301 with the use of the camera 300. At this time, the recognition unit 110 recognizes the type of the foodstuff on the basis of the foodstuff's shape, color, pattern, size, and the like. In addition, the recognition unit 110 may recognize the position of the foodstuff in the area 301. The photographable area 301 of the camera 300 will be described later using FIG. 3A.

The obtaining unit 120 recognizes the recognition result of recognizing a foodstuff serving as a cooking target on the basis of a photographed image obtained from the camera 300. The obtaining unit 120 obtains, for example, the recognition result of the recognition unit 110. Note that the display apparatus 100 may not necessarily include the recognition unit 110. In this case, the display apparatus 100 may include a communication unit that transmits a photographed image obtained from the camera 300 to a server and receives a recognition result from the server, and the obtaining unit 120 may obtain the recognition result received from the server.

The determination unit 130 determines whether a recognized foodstuff indicated by the recognition result is present in a superposable area where the first image can be superposed on the recognized foodstuff, out of a displayable area of the display unit 200. The detailed operation of the determination unit 130 will be described later using FIG. 4. The displayable area and the superposable area will be described later using FIG. 3B.

The display control unit 140 controls the display unit 200 in accordance with the determination result of the determination unit 130. Specifically, when the determination unit 130 determines that the recognized foodstuff is present in the superposable area, the display control unit 140 causes the display unit 200 to superpose the first image on the recognized foodstuff. Alternatively, when the determination unit 130 determines that the recognized foodstuff is not present in the superposable area, the display control unit 140 causes the display unit 200 to display a second image generated on the basis of the recognized foodstuff included in the photographed image obtained from the camera 300 and causes the display unit 200 to superpose the first image on the second image. The detailed operation of the display control unit 140 will be described later using FIGS. 4 to 5B.

2. Photographable Area, Displayable Area, and Superposable Area

Next, the photographable area of the camera 300, the displayable area of the display unit 200, and the superposable area will be described using FIGS. 3A and 3B.

Figure 3A:
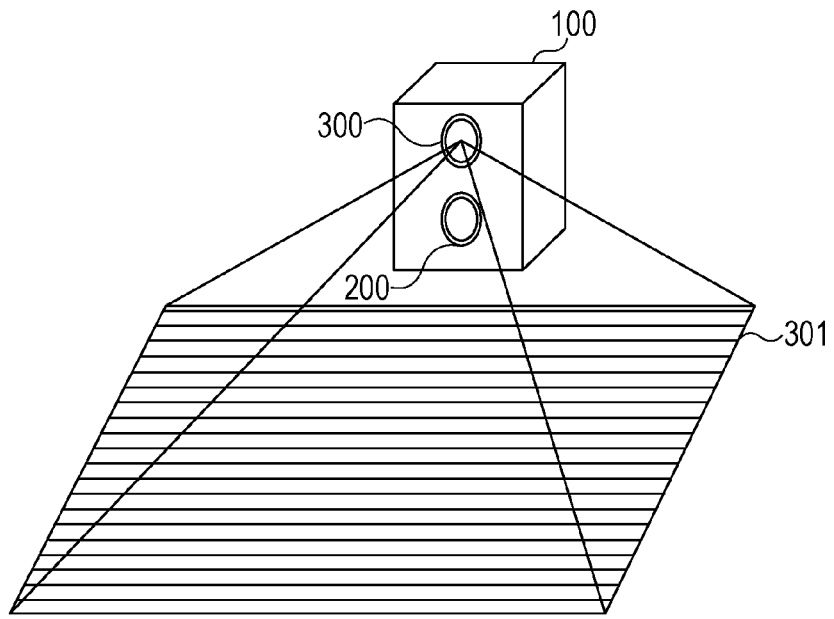
FIG. 3A is a diagram illustrating an example of a photographable area.
Figure 3B:
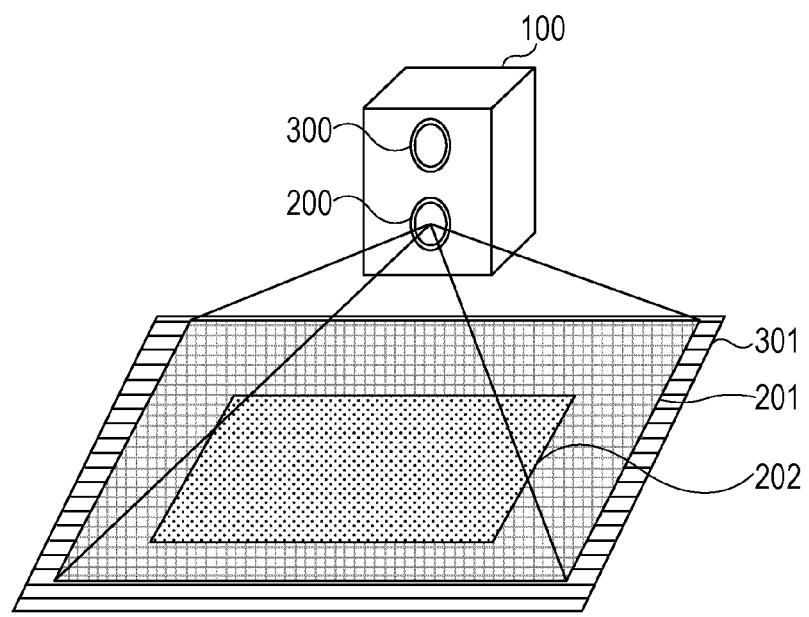
FIG. 3B is a diagram illustrating an example of a displayable area and a superposable area.

FIG. 3A is a diagram illustrating an example of the photographable area 301. FIG. 3B is a diagram illustrating an example of a displayable area 201 and a superposable area 202. FIG. 3B additionally illustrates the photographable area 301 in addition to the displayable area 201 and the superposable area 202. Although the photographable area 301, the displayable area 201, and the superposable area 202 are hatched in the drawings used in the following description, these areas are not actually hatched. Note that the cooker can recognize the boundaries of these areas, which will be described later using FIG. 7.

A foodstuff is placed in the photographable area 301, and the camera 300 photographs the photographable area 301. In doing so, the obtaining unit 120 can obtain the recognition result of recognizing the foodstuff serving as a cooking target on the basis of the photographed image obtained from the camera 300.

The displayable area 201 is, for example, an area where an image can be projected by the projector included in the display unit 200. For example, as illustrated in FIG. 3B, the displayable area 201 is narrower than the photographable area 301 and is within the photographable area 301.

The superposable area 202 is an area where the first image can be superposed on the foodstuff. For example, even within the displayable area 201, depending on the positional relationship between the foodstuff and the display unit 200, there is an area where the first image cannot be superposed accurately on the foodstuff. Therefore, the superposable area 202 is narrower than the displayable area 201. Note that the displayable area 201 may coincide with the superposable area 202.

3. Operation of Display Apparatus

Next, the operation of the display apparatus 100 according to the first embodiment will be described.

Figure 4:
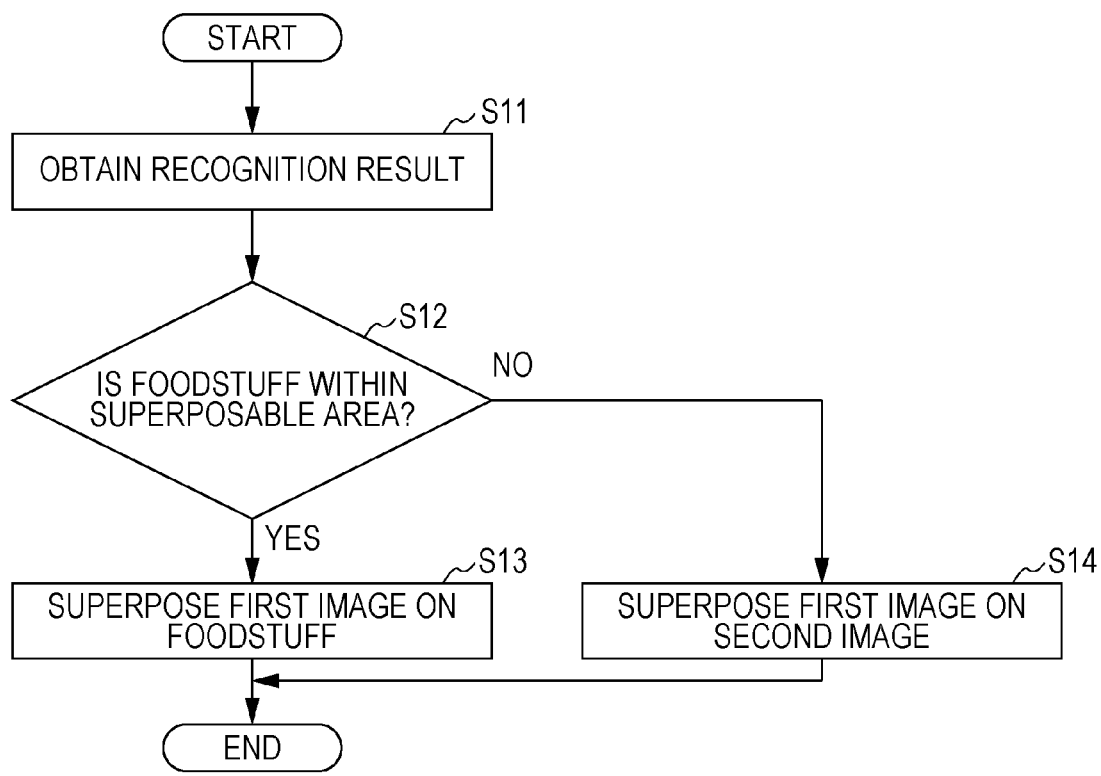
FIG. 4 is a flowchart illustrating an example of the operation of the display apparatus according to the first embodiment.

FIG. 4 is a flowchart illustrating an example of the operation of the display apparatus 100 according to the first embodiment.

Although not illustrated in FIG. 4, it is assumed that a cooking recipe to be followed by the cooker is determined from among cooking recipes stored in the storage unit. For example, the cooking recipe may be determined by inputting, by the cooker, a cooking recipe to the input unit of the display apparatus 100 or the mobile terminal. Alternatively, for example, the display unit 200 (projector) projects an image containing a plurality of cooking recipes onto the cooking table, and the cooker holds his/her hand over a cooking recipe to follow from among the projected cooking recipes. For example, on the basis of the image where the cooker holds his/her hand over the cooking recipe, which has been photographed by the camera 300, the recognition unit 110 determines over which cooking recipe, from among the projected cooking recipes, the cooker is holding his/her hand. In this manner, the cooking recipe to be followed by the cooker may be determined in accordance with the cooker's gesture from among cooking recipes stored in the storage unit. The cooker's hand may be wet or dirty with the foodstuff. Even in such a case, the cooker can determine the cooking recipe without making the mobile terminal or the like dirty.

The obtaining unit 120 recognizes the recognition result of recognizing a foodstuff serving as a cooking target on the basis of a photographed image obtained from the camera 300 (step S11). For example, the recognition unit 110 determines whether a foodstuff is present in the photographable area 301, and, if a foodstuff is present, the obtaining unit 120 obtains the recognition result of the recognition unit 110. Note that the recognition result includes the type of foodstuff recognized on the basis of the foodstuff's shape, color, pattern, size, and the like. Accordingly, a first image for assisting the cooker with a cooking action is determined for the type of foodstuff in the determined cooking recipe. For example, when the cooking recipe is a boiled mackerel, if the recognition result regarding the type of foodstuff is mackerel, a first image indicating a way to cut the mackerel (for example, how to drop the head off) is determined.

Next, the determination unit 130 determines whether the recognized foodstuff indicated by the recognition result obtained by the obtaining unit 120 is present in the superposable area 202 (step S12). Specifically, an area corresponding to the superposable area 202 is determined in advance in a photographed image obtained from the camera 300, and the determination unit 130 determines whether the foodstuff is included in this area.

When the determination unit 130 determines that the foodstuff is present in the superposable area 202 (YES in step S12), the display control unit 140 causes the display unit 200 to superpose the first image on the recognized foodstuff (step S13). The processing in step S13 will be described using FIG. 5A.

Figure 5A:
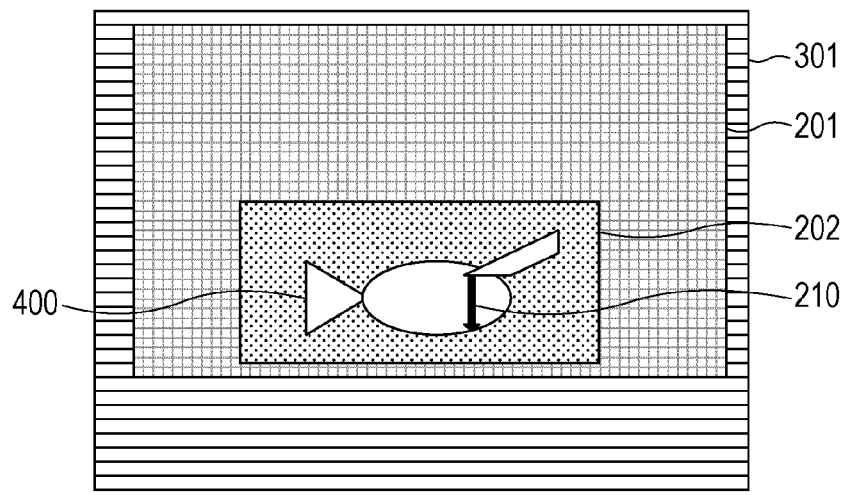
FIG. 5A is a diagram illustrating a first example of a first image superposed on a foodstuff according to the first embodiment.

FIG. 5A is a diagram illustrating a first example of a first image 210 superposed on a foodstuff 400 according to the first embodiment.

As illustrated in FIG. 5A, the foodstuff 400, which is recognized as a mackerel, is present in the superposable area 202, and the display unit 200 superposes the first image 210 (such as an image indicating a way to cut the head off) on the foodstuff 400 on the basis of an instruction from the display control unit 140. Accordingly, the cooker can easily cut the foodstuff 400 by cutting the foodstuff 400 in accordance with the first image 210 superposed on the foodstuff 400.

In contrast, when the determination unit 130 determines that the foodstuff 400 is not present in the superposable area 202 (NO in step S12), the display control unit 140 causes the display unit 200 to display a second image generated on the basis of the recognized foodstuff 400 within the displayable area 201, and causes the display unit 200 to superpose the first image 210 on the second image (step S14). The second image is, for example, a computer graphics image indicating a recognized foodstuff. As has been described above, for example, the recognition unit 110 recognizes the type of the foodstuff on the basis of photographing of the foodstuff done by the camera 300. The storage unit stores computer graphics images representing various types of foodstuffs, and a computer graphics image corresponding to the type of the foodstuff recognized by the recognition unit 110 serves as a second image. The processing in step S14 will be described using FIG. 5B.

Figure 5B:
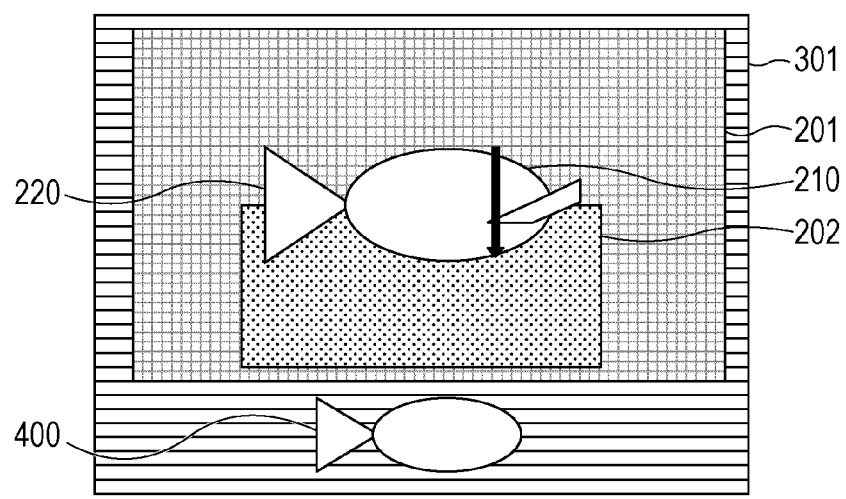
FIG. 5B is a diagram illustrating the first example of the first image superposed on a second image according to the first embodiment.

FIG. 5B is a diagram illustrating the first example of the first image 210 superposed on a second image 220 according to the first embodiment.

As illustrated in FIG. 5B, the foodstuff 400 is present outside the superposable area 202, and the display unit 200 displays the second image 220 (such as a computer graphics image indicating a mackerel) within the displayable area 201 on the basis of an instruction from the display control unit 140, and superposed the first image 210 on the second image 220. Accordingly, the cooker can easily cut the foodstuff 400 by cutting the foodstuff 400 while looking at the first image 210 superposed on the second image 220. Although the second image 220 is displayed in the example illustrated in FIG. 5B such that part of the second image 220 is positioned within the superposable area 202 and the remaining part of the second image 220 is positioned outside the superposable area 202 and within the displayable area 201, the displayed details are not limited to this example. For example, the second image 220 may be displayed outside the superposable area 202 and within the displayable area 201. Alternatively, the second image 220 may be displayed within the superposable area 202.

When part of the recognized foodstuff is present in the superposable area 202, the determination unit 130 may determine that the recognized foodstuff is present in the superposable area 202.

Figure 6A:
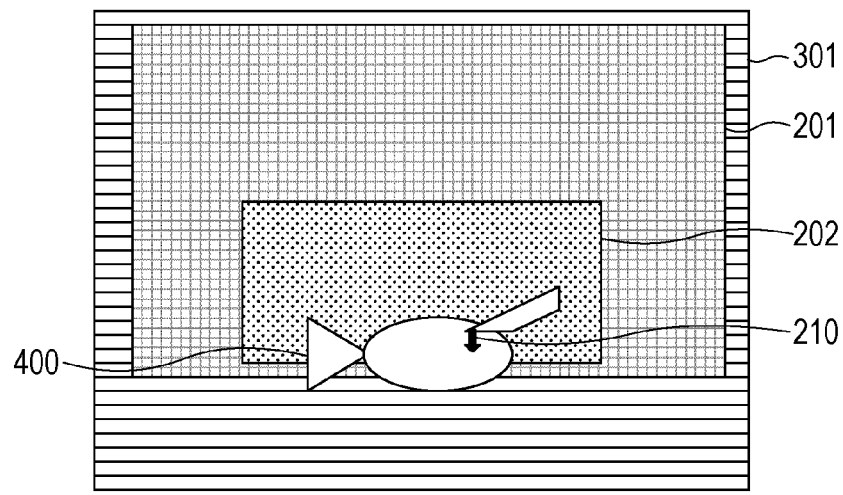
FIG. 6A is a diagram illustrating a second example of the first image superposed on the foodstuff according to the first embodiment.

FIG. 6A is a diagram illustrating a second example of the first image 210 superposed on the foodstuff 400 according to the first embodiment. As illustrated in FIG. 6A, when part of the recognized foodstuff 400 is present in the superposable area 202, the first image 210 may be superposed on the part of the foodstuff 400 that is present in the superposable area 202.

In contrast, when part of the recognized foodstuff 400 is present in the superposable area 202, the determination unit 130 may determine that the recognized foodstuff 400 is not present in the superposable area 202.

Figure 6B:
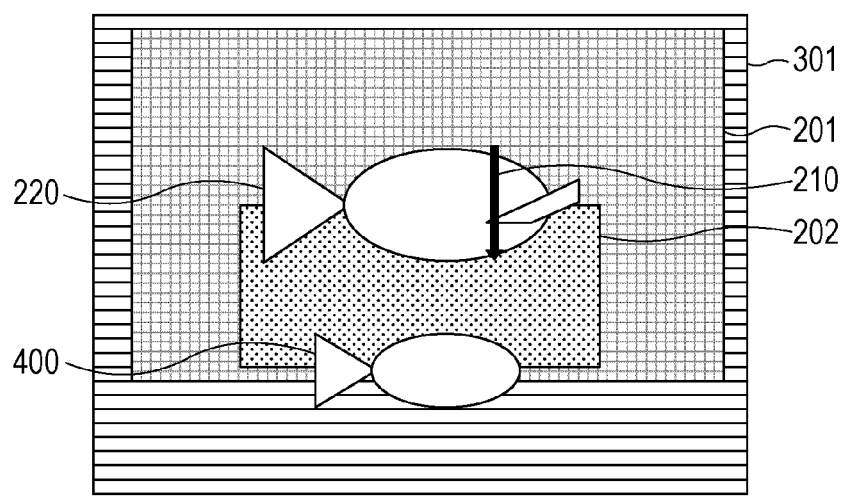
FIG. 6B is a diagram illustrating the second example of the first image superposed on the second image according to the first embodiment.

FIG. 6B is a diagram illustrating the second example of the first image 210 superposed on the second image 220 according to the first embodiment. As illustrated in FIG. 6B, when part of the recognized foodstuff 400 is present in the superposable area 202, the first image 210 may be superposed on the second image 220.

By the way, when the foodstuff is present in the superposable area 202, the cooker may feel that the first image superposed on the foodstuff is disturbing and may want to switch the target on which the first image is superposed from the foodstuff to the second image (computer graphics image). In addition, when the foodstuff is not present in the superposable area 202, the cooker may feel that the first image superposed on the second image is not helpful enough to understand the cooking method and may want to switch the target on which the first image is superposed from the second image to the foodstuff. Thus, when the display unit 200 is currently superposing the first image on the foodstuff, if the determination unit 130 determines that the foodstuff is not present in the superposable area 202, the display control unit 140 may give an instruction to the display unit 200 to superpose the first image on the second image. In another case, when the display unit 200 is currently superposing the first image on the second image, if the determination unit 130 determines that the foodstuff is present in the superposable area 202, the display control unit 140 may give an instruction to the display unit 200 to superpose the first image on the foodstuff. Accordingly, when the cooker feels that the first image superposed on the foodstuff is disturbing, the cooker can receive assistance for the cooking action from the first image superposed on the second image by moving the foodstuff from the inside to the outside of the superposable area 202. Alternatively, the cooker can receive assistance for the cooking action from the first image superposable on the foodstuff by moving the foodstuff from the outside to the inside of the superposable area 202.

In this case, for example, the camera 300 may photograph every certain time, and, whenever a new photographed image is obtained from the camera 300, the obtaining unit 120 may newly obtain the recognition result of recognizing a foodstuff serving as a cooking target on the basis of the new photographed image. Every time the obtaining unit 120 obtains a new recognition result, the determination unit 130 may determine whether a recognized foodstuff indicated by the new recognition result is present in the superposable area 202, out of the displayable area 201 of the display unit 200.

For example, the case will be considered in which, when the first image is currently superposed on a foodstuff that is present in the superposable area 202, the foodstuff is moved to the outside of the superposable area 202. In this case, because a photographed image where the foodstuff is present outside the superposable area 202 is newly obtained by photographing done by the camera 300 after the foodstuff is moved from the inside to the outside of the superposable area 202, the obtaining unit 120 obtains a new recognition result corresponding to the newly obtained photographed image. The determination unit 130 newly determines that a recognized foodstuff indicated by the new recognition result is not present in the superposable area 202. The display control unit 140 controls the display unit 200 in accordance with the new recognition result obtained by the determination unit 130. More specifically, for example, the display control unit 140 causes the display unit 200 to display the second image and to superpose the first image on the second image. Accordingly, the target on which the first image is superposed is automatically switched from the foodstuff to the second image.

In addition, for example, the case will be considered in which, when the first image is currently superposable on the second image, the foodstuff corresponding to the second image is moved to the interior of the superposable area 202. In this case, because a photographed image where the foodstuff is present in the superposable area 202 is newly obtained by photographing done by the camera 300 after the foodstuff is moved from the outside to the inside of the superposable area 202, the obtaining unit 120 obtains a new recognition result corresponding to the newly obtained photographed image. The determination unit 130 newly determines that a recognized foodstuff indicated by the new recognition result is present in the superposable area 202. The display control unit 140 controls the display unit 200 in accordance with the new recognition result obtained by the determination unit 130. More specifically, for example, the display control unit 140 causes the display unit 200 to superpose the first image on the foodstuff. Accordingly, the target on which the first image is superposed is automatically switched from the second image to the foodstuff.

Although the camera 300 photographs every certain time in the above-described examples, the case is not limited to these examples. For example, the cooker may give a photographing instruction to the camera 300 after moving the foodstuff from the inside to the outside of the superposable area 202 or from the outside to the inside of the superposable area 202. For example, the cooker may give a photographing instruction to the camera 300 using the input unit of the display apparatus 100 or the mobile terminal operating the display apparatus 100 via a network.

In doing so, a photographed image photographed while the foodstuff is moved from the outside to the inside of the superposable area 202 or from the inside to the outside of the superposable area 202, a recognition result for the photographed image, and a determination based on the recognition result become unnecessary in the above-described operation, and accordingly, unnecessary photographing and determinations are not performed.

To move the foodstuff from one to the other of the inside and outside of the superposable area 202, the cooker needs to recognize the outer edge of the superposable area 202. In addition, to receive assistance for the cooking action from the first image superposable on the foodstuff or the first image superposed on the second image, the cooker needs to place the foodstuff within the photographable area 301 and thus needs to recognize the outer edge of the photographable area 301. Thus, the display unit 200 may additionally display the outer edge of the photographable area 301 and the outer edge of the superposable area 202.

Figure 7:
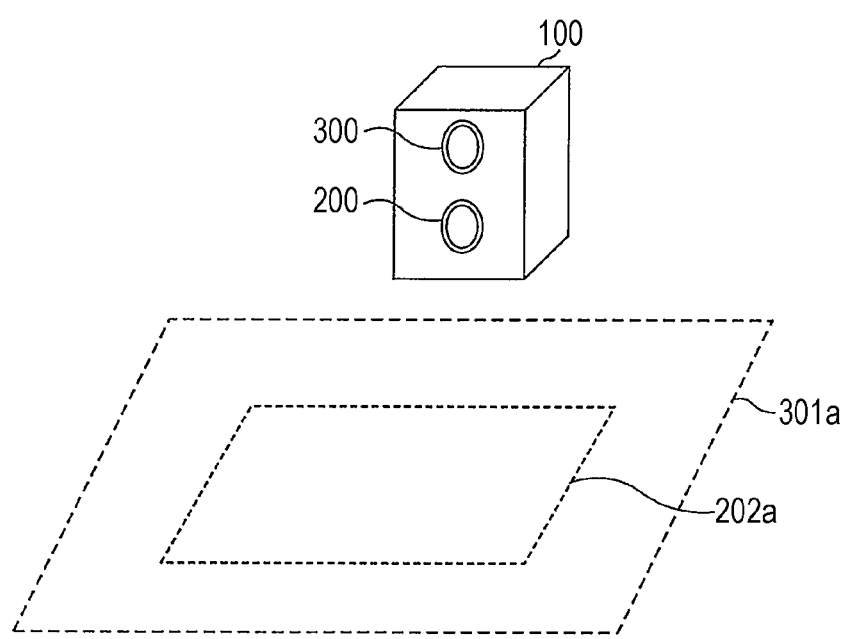
FIG. 7 is a diagram illustrating an example of the outer edge of a photographable area and the outer edge of a superposable area.

FIG. 7 is a diagram illustrating an example of an outer edge 301a of the photographable area 301 and an outer edge 202a of the superposable area 202.

For example, the display unit 200 displays the outer edges 301a and 202a using the projector, a laser light source, or the like. The laser light source or the like may be included in the display apparatus 100 or may be provided separately from the display apparatus 100. When the photographable area 301 is narrower than the displayable area 201, the display unit 200 displays the outer edges 301a and 202a using, for example, the projector. When the photographable area 301 is wider than the displayable area 201, the display unit 200 displays the outer edges 301a and 202a using, for example, the laser light source or the like. Accordingly, because the outer edge 301a of the photographable area 301 is displayed, the cooker can know where to place the foodstuff in order that the foodstuff may be photographed by the camera 300. In addition, because the outer edge 202a of the superposable area 202 is displayed, the cooker can know where to place the foodstuff in order that the foodstuff may be within or outside the superposable area 202. Thus, the cooker can know whether he/she can receive assistance for the cooking action from the first image superposed on the foodstuff or from the first image superposed on the second image. In addition, because the cooker can recognize the outer edge 202a, the cooker can move the foodstuff from one to the other of the inside and outside of the superposable area 202, and can switch the target on which the first image is superposed from one to the other of the foodstuff and the second image.

Note that the second image is not limited to a computer graphics image, and may be a photograph of a recognized foodstuff obtained by photographing done by the camera 300. Specifically, part of a foodstuff included in an image obtained by photographing done by the camera 300 may be extracted and displayed. In doing so, the first image is superposed not on a computer graphics image, but on a realistic photograph representing the foodstuff itself. Therefore, because the first image is superposed on the photograph of the actual foodstuff to be cooked, the cooker can more easily apply the assistance for the cooking action indicated by the first image to the actual foodstuff.

Although the example where the display unit 200 includes the projector has been described, the display unit 200 may further include a display. In this case, when the determination unit 130 determines that the recognized foodstuff is present in the superposable area 202, the display control unit 140 causes the projector to superpose the first image on the recognized foodstuff. In contrast, when the determination unit 130 determines that the recognized foodstuff is not present in the superposable area 202, the display control unit 140 causes the display to superpose the first image on the second image and to display the superposed image. In doing so, the cooker can cook while looking at the display displaying an image where the first image is superposed on the second image.

As has been described above, when the foodstuff is present in the superposable area 202, the first image is superposed on the foodstuff and is displayed; and, when the foodstuff is not present in the superposable area 202, the first image is superposed on the second image and is displayed. Thus, even when the foodstuff is not present in the superposable area 202, the cooker can cook while looking at the first image superposed on the second image. Therefore, the cooker can be assisted with the cooking action even when the foodstuff is present outside the superposable area 202.

Second Embodiment

Next, a second embodiment will be described using FIG. 8. Because the configuration of a display apparatus according to the second embodiment is the same as that of the first embodiment, a description thereof will be omitted. The second embodiment differs from the first embodiment in the point that the display size of the second image (such as a computer graphics image) is equivalent to the size of the recognized foodstuff. This point will be described using FIG. 8.

Figure 8:
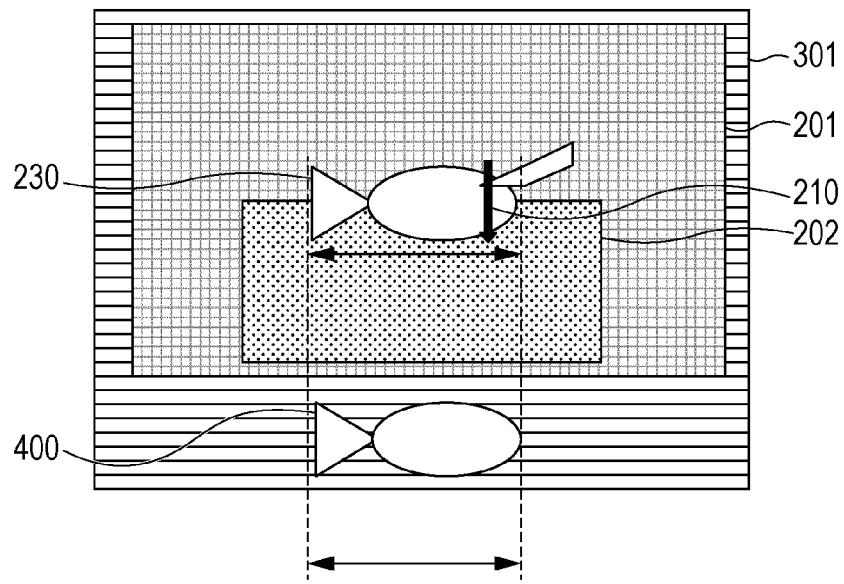
FIG. 8 is a diagram illustrating an example of a second image that has been reduced in size according to a second embodiment.

FIG. 8 is a diagram illustrating an example of a second image 230 that has been reduced in size according to the second embodiment. As illustrated in FIG. 8, the foodstuff 400 is present outside the superposable area 202, and the display unit 200 superposes the first image 210 on the second image 230 on the basis of an instruction from the display control unit 140. In the first embodiment, the size of the second image 220 is larger than the size of the foodstuff 400, as illustrated in FIG. 5B. In the second embodiment, the size of the foodstuff 400 is recognized, and the display size of the second image 220 is reduced in size, thereby causing the display unit 200 to display the second image 230 whose display size is equivalent to the size of the foodstuff 400. Accordingly, because the first image 210 is superposed on the second image 230 whose size is equivalent to the actual foodstuff 400 to be cooked, the cooker can more easily apply the assistance for the cooking action indicated by the first image 210 to the actual foodstuff 400.

An image that is enlarged or reduced in size to be of the equivalent size as the size of the foodstuff may not necessarily be a computer graphics image, and may be a photograph of the foodstuff obtained by photographing done by the camera 300.

Third Embodiment

Next, a third embodiment will be described using FIG. 9. Because the configuration of a display apparatus according to the third embodiment is the same as that of the first embodiment, a description thereof will be omitted. In the third embodiment, the determination unit 130 further determines whether the recognized foodstuff is present in the displayable area 201. In addition, the third embodiment differs from the first embodiment in the point that, when the determination unit 130 determines that the recognized foodstuff is not present in the displayable area 201 and when the distance between the position of the recognized foodstuff and an end portion of the displayable area 201 that is nearer to the recognized foodstuff is shorter than a certain distance, the display control unit 140 causes the display unit 200 to display an image based on the first image near the end portion of the displayable area 201. This point will be described using FIG. 9.

Figure 9:
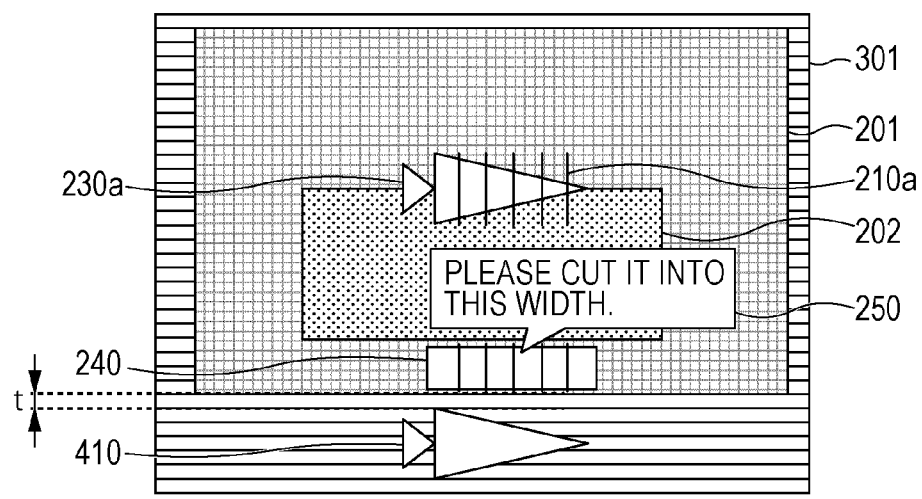
FIG. 9 is a diagram illustrating an example of an image indicating a way to cut according to a third embodiment.

FIG. 9 is a diagram illustrating an example of an image 240 indicating a way to cut according to the third embodiment. As illustrated in FIG. 9, a foodstuff 410 (such as a carrot) is present outside the superposable area 202, and the display unit 200 superposes a first image 210a (such as an image that indicates slicing into rings) on a second image 230a on the basis of an instruction from the display control unit 140.

Because the foodstuff 410 is not present in the displayable area 201, the determination unit 130 determines that the foodstuff 410 is not present in the displayable area 201. The determination unit 130 further determines whether the distance between the position of the foodstuff 410 and an end portion of the displayable area 201 nearer to the position of the foodstuff 410 is shorter than a certain distance t. The end portion of the displayable area 201 nearer to the position of the foodstuff 410 corresponds to a first end portion. The certain distance t is a distance at which the cooker can visually and simultaneously recognize a plurality of targets that are distant from each other, and is, for example, 5 cm. When the distance between the position of the foodstuff 410 and the end portion of the displayable area 201 nearer to the position of the foodstuff 410 is shorter than the certain distance t, the display control unit 140 gives an instruction to the display unit 200 to display the image 240, which indicates the way to cut the foodstuff 410 in order to cook the foodstuff 410, as an image based on the first image near the end portion of the displayable area 201, thereby displaying the image 240. In this case, the image 240, which indicates the way to cut the foodstuff 410, is displayed between the first end portion and a second end portion corresponding to an end portion of the superposable area 202 nearer to the position of the foodstuff 410. In addition, a description image 250 for describing the image 240, which indicates the way to cut the foodstuff 410, may also be displayed. As illustrated in FIG. 9, the description image 250 includes a text image corresponding to text describing how to cut the foodstuff 410 by referring to the image 240, which indicates the way to cut the foodstuff 410, such as "Please cut it into this width".

Accordingly, when the foodstuff is not present in the displayable area 201 of the display unit 200, if the distance between the position of the foodstuff and the end portion of the displayable area 201 nearer to the position of the foodstuff is shorter than a certain distance (such as 5 cm), an image based on the first image is displayed near the end portion of the displayable area 201 (that is, near the foodstuff). Therefore, the cooker can more accurately cook the foodstuff in accordance with the image based on the first image, which is displayed near the foodstuff. For example, the cooker can more accurately cook, such as cut, the foodstuff in accordance with an image indicating the way to cut the foodstuff, which serves as the image based on the first image, displayed near the foodstuff.

The image based on the first image is not limited to the image 240 indicating the way to cut the foodstuff, and may be, for example, an image indicating the scale.

Other Embodiments

Although the display apparatus according to the present disclosure has been described on the basis of the embodiments, the present disclosure is not limited to these embodiments. The present disclosure includes an embodiment achieved by implementing various modifications conceivable by a skilled person to the embodiments or an embodiment achieved by combining components in different embodiments within a scope that does not depart from the spirit of the present disclosure.

For example, the display apparatus may be realized as a server apparatus. By realizing the display unit 200 and the camera 300 as client apparatuses, a client-server system may be configured by the server apparatus and the client apparatuses.

In addition, for example, the display apparatus need not be provided with the camera 300, and may be an apparatus that exchanges information with the camera 300.

The present disclosure can be realized not only as a display apparatus, but also as a display method including steps (processes) performed by the components included in the display apparatus.

For example, these steps may be executed by a computer (computer system). The present disclosure can be realized as a program causing a computer to execute the steps included in the method. Furthermore, the present disclosure can be realized as a non-transitory computer-readable recording medium such as compact-disc read-only memory (CD-ROM) storing the program.

For example, when the present disclosure is realized as a program (software), the steps are executed by executing the program with the use of hardware resources such as a central processing unit (CPU), memory, and an input/output circuit of the computer. In other words, the steps are executed when the CPU obtains data from the memory or the input/output circuit, performs calculations, and outputs the calculation results to the memory or the input/output circuit.

The components included in the display apparatus according to the above-described embodiments may be individually realized as dedicated or general circuits. These components may be realized as one circuit or a plurality of circuits.

The components included in the display apparatus according to the embodiments may be realized as large-scale integration (LSI) which is an integrated circuit (IC). These components may be individually formed as chips or may be formed as one chip including some or all of the components. The LSI may be referred to as system LSI, super LSI, or ultra LSI depending on differences in integration.

The IC is not limited to LSI, and may be realized by a dedicated circuit or a general processor. A field programmable gate array (FPGA) or a reconfigurable processor where the connections and settings of circuit cells inside the LSI can be reconfigured may be utilized.

The present disclosure includes an embodiment achieved by implementing various modifications conceivable by a skilled person to the embodiments, or an embodiment achieved by arbitrarily combining components and functions in the embodiments within a scope that does not depart from the spirit of the present disclosure.

What is claimed is:

1. A display apparatus comprising:
    a display unit that displays a first image for assisting a cooker with a cooking action;
    a processor; and
    a memory that stores a program,
    wherein, the program causes the processor to function as:
    an obtaining unit that obtains a recognition result of recognizing a foodstuff serving as a cooking target on the basis of a photographed image obtained from a camera;
    a determination unit that determines whether a recognized foodstuff indicated by the recognition result is present in a superposable area where the first image can be superposed on the recognized foodstuff, out of a displayable area of the display unit; and
    a display control unit that causes the display unit to:
    (i) superpose the first image on the recognized foodstuff when the determination unit determines that the recognized foodstuff is present in the superposable area; and
    (ii) display a second image generated on the basis of the recognized foodstuff included in the photographed image obtained from the camera and superpose the first image on the second image when the determination unit determines that the recognized foodstuff is not present in the superposable area.

2. The display apparatus according to claim 1, wherein the display unit includes a projector.

3. The display apparatus according to claim 1, wherein:
    the display unit includes a projector and a display, and
    the display control unit
        causes the projector to superpose the first image on the recognized foodstuff when the determination unit determines that the recognized foodstuff is present in the superposable area; and
        causes the display to superpose the first image on the second image when the determination unit determines that the recognized foodstuff is not present in the superposable area.

4. The display apparatus according to claim 1, wherein:
    after the display unit superposes the first image on the recognized foodstuff, the obtaining unit newly obtains a recognition result of recognizing a foodstuff serving as a cooking target on the basis of a photographed image newly obtained from the camera, the determination unit newly determines whether a recognized foodstuff indicated by the newly obtained recognition result is present in a superposable area where the first image can be superposed on the recognized foodstuff indicated by the newly obtained recognition result, out of the displayable area of the display unit, and the display control unit causes the display unit to superpose the first image on the second image when the determination unit newly determines that the recognized foodstuff indicated by the newly obtained recognition result is not present in the superposable area.

5. The display apparatus according to claim 1, wherein:

after the display unit superposes the first image on the second image, the obtaining unit newly obtains a recognition result of recognizing a foodstuff serving as a cooking target on the basis of a photographed image newly obtained from the camera, the determination unit newly determines whether a recognized foodstuff indicated by the newly obtained recognition result is present in a superposable area where the first image can be superposed on the recognized foodstuff indicated by the newly obtained recognition result, out of the displayable area of the display unit, and the display control unit causes the display unit to superpose the first image on the recognized foodstuff indicated by the newly obtained recognition result when the determination unit newly determines that the recognized foodstuff indicated by the newly obtained recognition result is present in the superposable area.

6. The display apparatus according to claim 1, wherein the second image is a photograph of the recognized foodstuff obtained by photographing done by the camera.

7. The display apparatus according to claim 1, wherein the second image is a computer graphics image indicating the recognized foodstuff.

8. The display apparatus according to claim 1, wherein a display size of the second image is equivalent to a size of the recognized foodstuff.

9. The display apparatus according to claim 1, wherein:

the determination unit further determines whether the recognized foodstuff is present in the displayable area, when the determination unit determines that the recognized foodstuff is not present in the displayable area, the determination unit further determines whether a distance between a position of the recognized foodstuff and a first end portion is shorter than a certain distance, the first end portion being an end portion of the displayable area that is nearer to the position of the recognized foodstuff, and when the determination unit determines that the distance between the position of the recognized foodstuff and the first end portion is shorter than the certain distance, the display control unit causes the display unit to display an image based on the first image between the first end portion and an end portion of the superposable area.

10. The display apparatus according to claim 9, wherein the image based on the first image includes an image indicating a way to cut the recognized foodstuff.

11. The display apparatus according to claim 1, wherein the display unit further displays an outer edge of a photographable area of the camera, and an outer edge of the superposable area.

12. The display apparatus according to claim 1, further comprises the camera, wherein the program further causes the processor to function as a recognition unit that recognizes a foodstuff serving as a cooking target on the basis of a photographed image obtained from the camera, wherein the obtaining unit obtains the recognition result from the recognition unit.

13. The display apparatus according to claim 1, further comprising:

the camera; and a transmitter that transmits a photographed image obtained from the camera to a server, and receives the recognition result based on the photographed image from the server, wherein the obtaining unit obtains the recognition result from the communication unit.

14. A display method for a display apparatus including a display unit that displays a first image for assisting a cooker with a cooking action, the method comprising:

obtaining a recognition result of recognizing a foodstuff serving as a cooking target on the basis of a photographed image obtained from a camera;

determining whether a recognized foodstuff indicated by the recognition result is present in a superposable area where the first image can be superposed on the recognized foodstuff, out of a displayable area of the display unit; and causing the display unit to display a second image generated on the basis of the recognized foodstuff which is included in the photographed image obtained from the camera and which is determined not to be present in the superposable area and to superpose the first image on the second image.

15. A non-transitory computer-readable recording medium storing a program causing a computer to execute a process for controlling an operation of a display apparatus including a display unit that displays a first image for assisting a cooker with a cooking action, the process comprising:

obtaining a recognition result of recognizing a foodstuff serving as a cooking target on the basis of a photographed image obtained from a camera;

determining whether a recognized foodstuff indicated by the recognition result is present in a superposable area where the first image can be superposed on the recognized foodstuff, out of a displayable area of the display unit; and causing the display unit to:

(i) superpose the first image on the recognized foodstuff when it is determined in the determining that the recognized foodstuff is present in the superposable area; and (ii) display a second image generated on the basis of the recognized foodstuff included in the photographed image obtained from the camera and superpose the first image on the second image when it is determined in the determining that the recognized foodstuff is not present in the superposable area.

* * * * *